(12) United States Patent
Awata et al.

(10) Patent No.: US 9,108,552 B2
(45) Date of Patent: Aug. 18, 2015

(54) VEHICLE SEAT AND RESIN SEATBACK SPRING

(75) Inventors: Shinji Awata, Aichi-gun (JP); Hisaya Mori, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/812,620

(22) PCT Filed: Oct. 25, 2011

(86) PCT No.: PCT/JP2011/074574
§ 371 (c)(1),
(2), (4) Date: Jan. 28, 2013

(87) PCT Pub. No.: WO2013/061407
PCT Pub. Date: May 2, 2013

(65) Prior Publication Data
US 2014/0225352 A1    Aug. 14, 2014

(51) Int. Cl.
*B60R 21/207*    (2006.01)
*B60N 2/64*    (2006.01)
*B60N 2/70*    (2006.01)
(Continued)

(52) U.S. Cl.
CPC ............... *B60N 2/64* (2013.01); *B60N 2/7011* (2013.01); *B60N 2/7094* (2013.01); *B60N 2/72* (2013.01); *B60R 21/207* (2013.01); *B60N 2002/5808* (2013.01)

(58) Field of Classification Search
CPC .......... B60N 2/42; B60N 2/64; B60N 2/7011; B60N 2/7094; B60N 2/72; B60N 2002/5808; B60R 21/207

USPC .......... 280/728.2, 730.2; 297/216.13, 452.18, 297/452.2, 452.31, 452.36, 452.52, 452.53, 297/452.54, 452.63; 267/142, 143, 148

See application file for complete search history.

(56) References Cited

U.S. PATENT DOCUMENTS 5,893,579 A    4/1999    Kimura et al.
6,378,946 B1 *    4/2002    Cope et al. ................. 297/452.2
(Continued)

FOREIGN PATENT DOCUMENTS

DE    102006021508 A1    11/2007
EP    2070764 A2    6/2009
(Continued)

OTHER PUBLICATIONS

Feb. 20, 2015 Search Report issued in European Application No. 11870170.5.

*Primary Examiner* — Paul N Dickson
*Assistant Examiner* — Joselynn Y Sliteris
(74) *Attorney, Agent, or Firm* — Oliff PLC (57) ABSTRACT

A vehicle seat is obtained that allows good assembly operation characteristics of a side airbag device to a side-frame of a seatback frame. In a vehicle seat, stud bolts and nuts that fasten and fix a side airbag device to a side-frame are covered by a frame attachment section of a resin seatback spring. However, the frame attachment section is formed with openings at positions facing the stud bolts and the nuts. During manufacture of the vehicle seat, it is accordingly possible to perform a fixing operation of the side airbag device to the side-frame through the openings even in cases where the resin seatback spring is assembled to a seatback frame before assembling the side airbag device to the side-frame.

14 Claims, 6 Drawing Sheets

(51) Int. Cl.
  *B60N 2/72* (2006.01)
  *B60N 2/58* (2006.01)

(56) References Cited

U.S. PATENT DOCUMENTS

| | | |
|---|---|---|
| 6,637,824 B1 | 10/2003 | Yokota |
| 7,669,889 B1 * | 3/2010 | Gorman et al. ............ 280/730.2 |
| 8,690,255 B2 * | 4/2014 | Yamaki et al. ........... 297/452.52 |
| 2001/0011812 A1 | 8/2001 | Seki et al. |
| 2010/0133732 A1 | 6/2010 | Yamaguchi et al. |

FOREIGN PATENT DOCUMENTS

| | | |
|---|---|---|
| EP | 2108287 A1 | 10/2009 |
| JP | U-62-153945 | 9/1987 |
| JP | H08-242967 A | 9/1996 |
| JP | A-2004-138156 | 5/2004 |
| JP | 2010-125122 A | 6/2010 |
| JP | A-2010-142530 | 7/2010 |
| JP | A-2010-240249 | 10/2010 |
| JP | 2011-105251 A | 6/2011 |
| JP | A-2012-35811 | 2/2012 |
| WO | WO 2012/020697 A1 | 2/2012 |

* cited by examiner

VEHICLE SEAT AND RESIN SEATBACK SPRING

TECHNICAL FIELD

The present invention relates to a vehicle seat and a resin seatback spring.

BACKGROUND ART

In a following Patent Document 1, it is disclosed that a spring (a seatback spring) that spans between a left and right pair of side-frames provided to a seatback frame is made out of resin, from the perspective of achieving a reduction in the weight of a vehicle seat.

PRIOR ART DOCUMENT

Patent Document

Patent Document 1, Japanese Patent Application Laid-Open (JP-A) No. 2004-138156

DISCLOSURE OF INVENTION

Technical Problem

However, a side airbag device is sometimes assembled to a side-frame of the seatback frame. It is accordingly demanded that no deterioration in assembly operation characteristics of the side airbag device results from the presence of the resin seatback spring.

In consideration of the above circumstances, an object of the present invention is to obtain a vehicle seat and resin seatback spring that allows good assembly operation characteristics of a side airbag device to a side-frame of a seatback frame.

Solution to Problem

A vehicle seat of a first aspect of the present invention includes: a seatback frame including left and right side-frames; a side airbag device that is disposed at a seat width direction outside of a first of the left or right side-frames and is fixed to the first side-frame from the seat width direction inside by a fixing member; and a resin seatback spring including a resin spring section disposed between the left and right side-frames and left and right frame attachment sections that are respectively supported at front sides of the left and right side-frames, that extend from seat width direction insides of the left and right side-frames towards a seat rear side, and that are coupled to the resin spring section, the resin seatback spring being formed with an opening at a position facing the fixing member in a first of the frame attachment sections supported at the first side-frame.

In the vehicle seat of the first aspect, the seatback frame includes the left and right side-frames, and the side airbag device is disposed at the seat width direction outside of the first side-frame. The side airbag device is fastened and fixed to the first side-frame from the seat width direction inside by the fixing member. The left and right frame attachment sections provided to the resin seatback spring are respectively supported at the front sides of the left and right side-frames, and the frame attachment sections are coupled to the resin spring section disposed between the left and right side-frames.

It is conceivable that the fixing member would be covered by the first frame attachment section supported at the first side-frame, since the left and right frame attachment sections extend from the seat width direction insides of the left and right side-frames towards the seat rear side. However, in the present aspect, the opening is formed to the first frame attachment section at a position facing the fixing member. During manufacture of the present vehicle seat, it is accordingly possible to perform a fixing operation of the side airbag device to the first side-frame through the opening even in cases where the resin seatback spring is assembled to the seatback frame before assembling the side airbag device to the first side-frame. Good assembly operation characteristics can therefore be achieved in assembly of the side airbag device to the side-frame.

A vehicle seat of a second aspect of the present invention is the vehicle seat of the first aspect wherein the resin spring section includes plural back spring body sections disposed in a row along a seatback height direction, and the opening is displaced in the seatback height direction with respect to the plural back spring body sections.

In the vehicle seat of the second aspect, the resin spring section of the resin seatback spring includes the plural back spring body sections disposed in a row along the seatback height direction. The plural back spring body sections are supported by the left and right side-frames through the left and right frame attachment sections when load from an occupant is input to the back spring body sections. In the present aspect, the opening formed in the first frame attachment section is displaced in the seatback height direction with respect to the plural back spring body sections. The load can accordingly be well supported at the locations in the first frame attachment section where the opening is not formed. The support from the plural back spring body sections can accordingly be stabilized.

A vehicle seat of a third aspect of the present invention is the vehicle seat of either the first or the second aspect further including: a seatback pad supported by the seatback frame; a seat cover covering the seatback pad; and an inside airbag inflation pressure transmission member, a first end portion of the inside airbag inflation pressure transmission member being fixed to a rear end side of the first side-frame, an intermediate portion of the inside airbag inflation pressure transmission member being inserted through an insertion hole formed in the first frame attachment section, and a second end portion of the inside airbag inflation pressure transmission member being sewn to a sewn portion of the seat cover.

In the vehicle seat of the third aspect, back inflation pressure when a side airbag provided to the side airbag device inflates is transmitted to the sewn portion of the seat cover through the inside airbag inflation pressure transmission member, of which the first end portion is fixed to the rear end side of the first side-frame and the second end portion is sewn to the sewn portion of the seat cover. The sewn portion of the seat cover can accordingly be made to promptly split open, and the side airbag can be made to inflate and deploy promptly from the split portion. Moreover, the layout path of the inside airbag inflation pressure transmission member can also be shortened since the intermediate portion of the inside airbag inflation pressure transmission member is inserted through the insertion hole formed in the first frame attachment section of the resin seatback spring.

A vehicle seat of a fourth aspect of the present invention is the vehicle seat of the third aspect wherein the insertion hole is formed in a front end side of the first frame attachment section and is disposed at the same height as any one of a plurality of the resin spring sections.

In the vehicle seat of the fourth aspect, the insertion hole formed in the first frame attachment section of the resin seatback spring for insertion of the inside airbag inflation pressure transmission member is disposed at the same height as any one of the plurality of the resin spring sections. It is therefore conceivable that when load from an occupant is input to that particular resin spring section stress would be concentrated at the periphery of the insertion hole in the first frame attachment section. However, in the present aspect, the insertion hole is formed at the front end side of the first frame attachment section, namely at a position away from the connection portion between that particular resin spring section and the first frame attachment section. Stress can accordingly be suppressed from being concentrated at the periphery of the insertion hole when load from an occupant is input to that particular resin spring section. Moreover, when the opening is disposed displaced in the seatback height direction with respect to the plurality of the resin spring sections as described in the second aspect, the opening and the insertion hole are also displaced in the seatback height direction. Weakening of the first frame attachment section at the height at which that particular resin spring section and the insertion hole are formed can thereby be suppressed. The support from that particular resin spring section can thereby be stabilized.

A vehicle seat of a fifth aspect of the present invention is the vehicle seat of either the third or the fourth aspect further including an outside airbag inflation pressure transmission member, a first end portion of the outside airbag inflation pressure transmission member being fixed to the rear end side of the side-frame, an intermediate portion of the outside airbag inflation pressure transmission member passing the side airbag device on the seat width direction outside, and a second end portion of the outside airbag inflation pressure transmission member being sewn to the sewn portion.

In the vehicle seat of the fifth aspect, when the side airbag provided to the side airbag device inflates, back inflation pressure is transmitted to the sewn portion of the seat cover through the outside airbag inflation pressure transmission member of which the first end portion is fixed to the rear end side of the first side-frame, the intermediate portion passes the side airbag device on the seat width direction outside, and the second end portion is sewn to the sewn portion of the seat cover. The sewn portion of the seat cover can accordingly be made to split open even more promptly. There is moreover no need to form an insertion hole through which to insert the intermediate portion of the outside airbag inflation pressure transmission member to the frame attachment section of the resin seatback spring due to the intermediate portion of the outside airbag inflation pressure transmission member passing the side airbag device on the seat width direction outside. It is accordingly possible to reduce the number of insertion holes formed to the frame attachment section.

A vehicle seat of a sixth aspect of the present invention is the vehicle seat of the fifth aspect further including a top and bottom pair of a outside airbag inflation pressure transmission members, the top side outside airbag inflation pressure transmission member being disposed at the same height as the inside airbag inflation pressure transmission member, and the bottom side outside airbag inflation pressure transmission member being disposed below the top side outside airbag inflation pressure transmission member.

In the vehicle seat of the sixth aspect, due to the top side outside airbag inflation pressure transmission member of the top and bottom pair of outside airbag inflation pressure transmission members being disposed at the same height as the inside airbag inflation pressure transmission member, the sewn portion of the seat cover can be made to split open even more promptly at the height at which the top side outside airbag inflation pressure transmission member and the inside airbag inflation pressure transmission member are disposed. Moreover, the sewn portion of the seat cover can be made to promptly split open over a wide range in the top-bottom direction (the seatback height direction) due to providing the top and bottom pair of outside airbag inflation pressure transmission members. The deployment direction of the side airbag can accordingly be stabilized.

A vehicle seat of a seventh aspect of the present invention is the vehicle seat of any one of the first aspect to the sixth aspect wherein the frame attachment sections are formed with open cross-section profiles that are open to the seat rear side, and that fit together with the front sides of the side-frames.

In the vehicle seat of the seventh aspect, when load from an occupant is input to the resin spring section of the resin seatback spring, reaction force from the left and right side-frames is borne by the left and right frame attachment sections. The frame attachment sections are formed with open cross-section profiles that are open to the seat rear side, and fit together with the front sides of the left and right side-frames. The support from the plural resin spring sections can accordingly be stabilized since the reaction force from the left and right side-frames can be well supported by the left and right frame attachment sections.

A vehicle seat of an eighth aspect of the present invention is the vehicle seat of any one of first aspect to the seventh aspect wherein the resin seatback spring further includes a backboard section that is disposed at a seatback back face to the seat rear side of a plurality of the resin spring sections and is coupled to the left and right frame attachment sections.

In the vehicle seat of the eighth aspect, the number of components and the number of processes to assemble components to the seatback frame can be reduced since the resin seatback spring is provided with the backboard section disposed at the seatback back face.

A vehicle seat of a ninth aspect of the present invention is the vehicle seat of any one of first aspect to the eighth aspect wherein: the fixing member includes a pair of top and bottom stud bolts provided to a gas generation unit that is installed to the side airbag device and a pair of top and bottom nuts screwed onto the pair of stud bolts; the side airbag device is fastened and fixed to the first side-frame by inserting the pair of stud bolts through the first side-frame from the seat width direction outside and screwing the pair of nuts onto the pair of stud bolts; the resin seatback spring includes 3 of the resin spring sections displaced in a seatback frame height direction with respect to the pair of stud bolts and the pair of nuts; and the opening is formed in the first frame attachment section at respective positions facing the pair of stud bolts and the pair of nuts.

In the ninth aspect, the resin seatback spring is provided with 3 of the resin spring sections disposed between the left and right side-frames in a row in the seatback height direction. The resin spring sections are disposed displaced in the seatback frame height direction with respect to the pair of stud bolts and with respect to the pair of nuts that fasten and fix the gas generation unit that is installed to the side airbag device to the first side-frame. The openings are formed in the first frame attachment section at respective positions facing the pair of stud bolts and the pair of nuts. Good assembly operation characteristics can thereby be achieved when assembling the gas generation unit (the side airbag device) provided with the pair of stud bolts to the first side-frame. Moreover, since the 3 resin spring sections and 2 openings are disposed displaced in the seatback height direction, similarly to the second aspect, the support from the plural resin spring sections can be stabilized.

A resin seatback spring of a tenth aspect of the present invention includes: a resin spring section disposed between left and, right side-frames that are provided to a seatback frame of a vehicle seat; and left and right frame attachment sections respectively including left and right supported portions respectively supported at a front sides of the left and right side-frames, and left and right coupling portions that extend towards a seat rear side from respective seat width direction inside end portions of the left and right supported portions and are coupled to the resin spring section, wherein an opening is formed in one of the left or right coupling portions.

In the resin seatback spring of the tenth aspect, the left and right supported portions provided to the left and right frame attachment sections are respectively supported at the front sides of the left and right side-frames of the seatback frame. The left and right coupling portions that extend towards the seat rear side from seat width direction inside end portions of the left and right supported portions are coupled to the resin spring section disposed between the left and right side-frames.

Portions of the left and right side-frames are covered from the seat width direction inside by the left and right coupling portions, due to the left and right coupling portions extending towards the seat rear side from seat width direction inside end portions of the left and right supported portions as described above. It is therefore conceivable that during manufacture of the vehicle seat, the coupling portion on the first side-frame side would be a nuisance in the assembly operation of the side airbag device in cases where the resin seatback spring is assembled to the seatback frame before the side airbag device is assembled to the first side-frame. In other words, it is conceivable that the coupling portion on the first side-frame side would be a nuisance when the side airbag device disposed at the seat width direction outside of the first side-frame is being fixed to the first side-frame with the fixing member from the seat width direction inside. However, in the present aspect, since the opening is formed to one of the left and right coupling members, the fixing operation of the side airbag device to the first side-frame can be performed through the opening. Good assembly operation characteristics can accordingly be achieved for the assembly of the side airbag device to the side-frame.

Advantageous Effects of Invention

As explained above, the vehicle seat according to the present invention allows good assembly operation characteristics of a side airbag device to a side-frame of a seatback frame.

BEST MODE FOR CARRYING OUT THE INVENTION

Explanation follows regarding a vehicle seat 10 and resin seatback spring 22 according to an exemplary embodiment of the present invention, with reference to FIG. 1 to FIG. 6. In the drawings the arrow FR indicates a vehicle front side, the arrow UP indicates the vehicle top side, and the arrow IN indicates the vehicle width direction inside, as appropriate.

Overall Configuration

Figure 1:
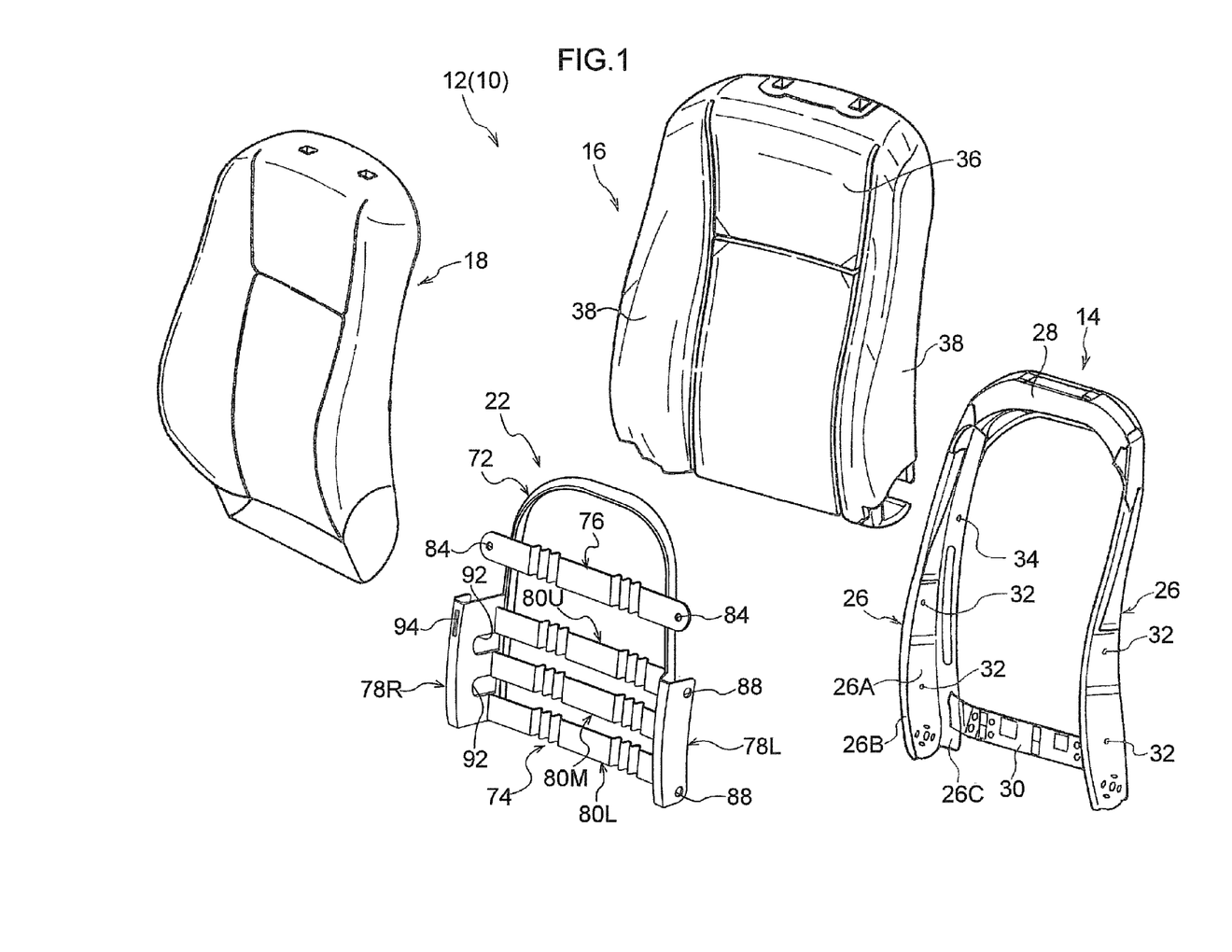
FIG. 1 is an exploded perspective view illustrating a seatback of a vehicle seat according to an exemplary embodiment of the present invention.

FIG. 1 is an exploded perspective view illustrating a seatback 12 corresponding to a backrest of the vehicle seat 10 according to the present exemplary embodiment. Note that in FIG. 1 the configuration elements are each depicted as viewed from slightly different angles from each other. The vehicle seat 10 is provided with a seat cushion, not shown in the drawings, for seating an occupant, and the seatback 12 is reclinably coupled at a rear edge portion of the seat cushion.

Figure 2:
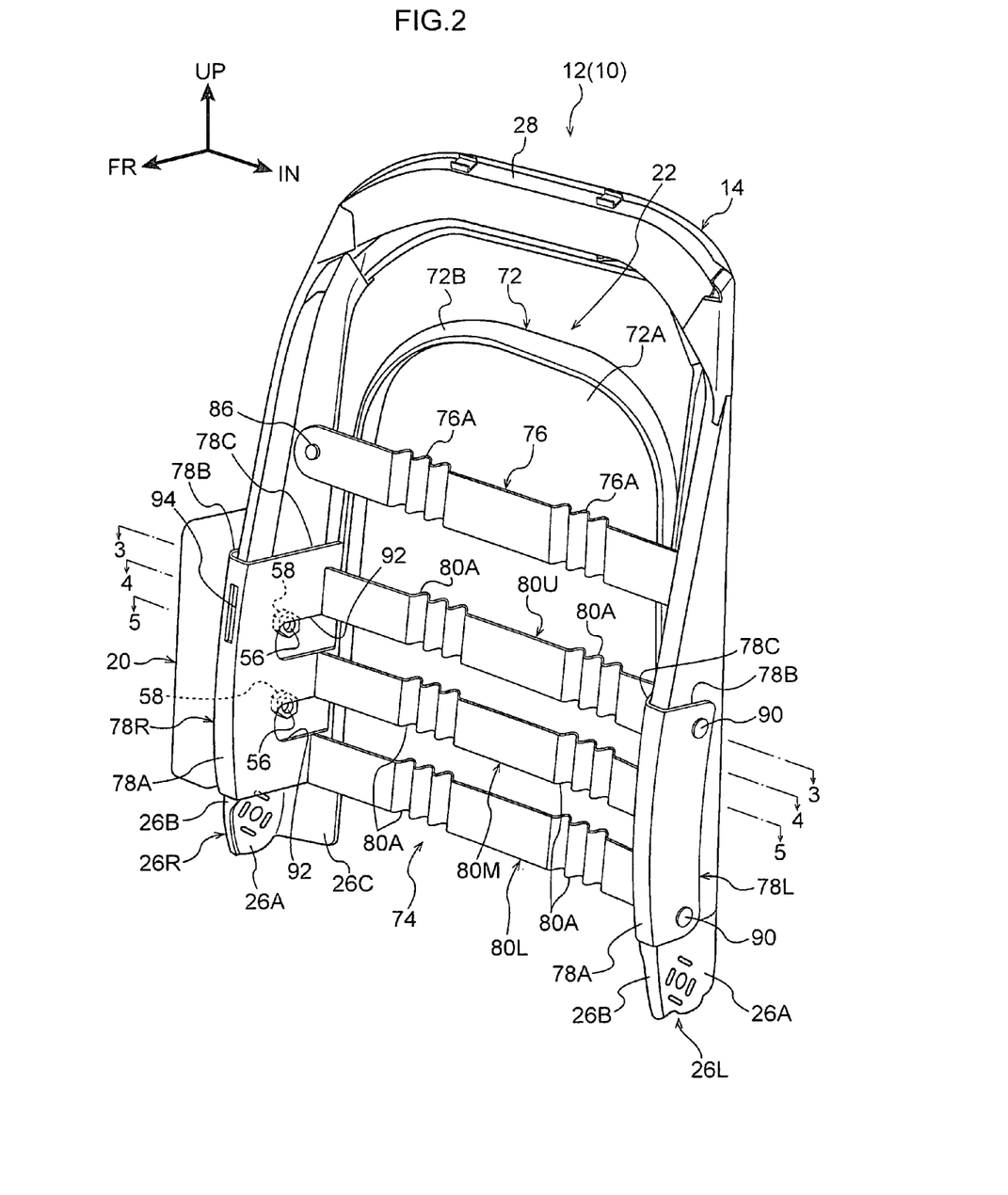
FIG. 2 is a perspective view illustrating an assembled state of a resin spring integral backboard to the seatback frame illustrated in FIG. 1.

As shown in FIG. 1, the seatback 12 is configured including a seatback frame 14 that is made from metal and configures a framework member of the seatback 12, a seatback pad 16 that is supported by the seatback frame 14, a seat cover 18 that covers the seatback pad 16, and a resin seatback spring 22 attached to the seatback frame 14. As shown in FIG. 2, the seatback 12 is further configured including a side airbag device 20 (a side airbag module, not illustrated in FIG. 1) attached to the seatback frame 14. Detailed explanation follows regarding each of the configuration elements.

Configuration of the Seatback Frame 14

As shown in FIG. 1 and FIG. 2, the seatback frame 14 is formed in a rectangular frame shape in front view (indicating a view from the front face of the vehicle; in the following explanation the direction of the vehicle, the direction of the vehicle seat 10 and the direction of the seatback 12 are the same as each other). More specifically, configuration includes a left and right pair of side-frames 26L, 26R disposed facing each other along the seat width direction (the vehicle width direction), an upper frame 28 that is formed in an inverted U-shape and connects together top end portions of the left and right side-frames 26L, 26R, and a lower frame 30 that connects together bottom end portions of the left and right side-frames 26L, 26R along the seat width direction. The seatback 12 is produced by press forming each of the four members, including the upper frame 28, however another frame structure may be employed. For example, configuration may be made with just the upper frame configured by pipe material bent into an inverted U-shape.

As shown in FIG. 1 to FIG. 5, the side-frames 26L, 26R are configured including a side wall portion 26A, a front wall portion 26B and a rear wall portion 26C. Each of the side-frames 26 is formed with a substantially C-shaped horizontal cross-section that opens towards the seat width direction inside. The side wall portion 26A extends along the seat front-rear direction, and the front wall portion 26B and the rear wall portion 26C respectively extend from a front edge and a rear edge of the side wall portion 26A towards the seat width direction inside. The width of the rear wall portion 26C is set sufficiently wider than the width of the front wall portion 26B. As shown in FIG. 1, plural (in this case 2) attachment holes 32 are formed in a lower portion of the side wall portion 26A with a separation in the top-bottom direction, and an attachment hole 34 is formed in an upper portion of the rear wall portion 26C. The attachment holes 32, 34 correspond with the resin seatback spring 22.

Configuration of the Seatback Pad 16

As shown in FIG. 1, the seatback pad 16 is configured including a pad central portion 36 configured by a foam body such as urethane foam, and a left and right pair of pad side portions 38. An upper edge side of the pad central portion 36 is anchored to the upper frame 28 of the seatback frame 14 from the seat top side, and a lower edge side of the pad central portion 36 is anchored from the seat bottom side to a connecting rod, not shown in the drawings, that connects together bottom end portions of the side-frames 26L, 26R along the seat width direction. The pad central portion 36 is supported from the seat rear side by a bottom side back spring section 74 and a top side back spring section 76 provided to the resin seatback spring 22.

The pad side portions 38 are formed with a substantially C-shaped cross-sectional profile. The pad side portions 38 are mounted so as to wrap around the side-frames 26L, 26R (see FIG. 3 to FIG. 5). The pad side portions 38 are shaped to bulge out further towards the seat front side than the pad central portion 36, securing side support properties for an occupant.

Configuration of the Seat Cover 18

Figure 3:
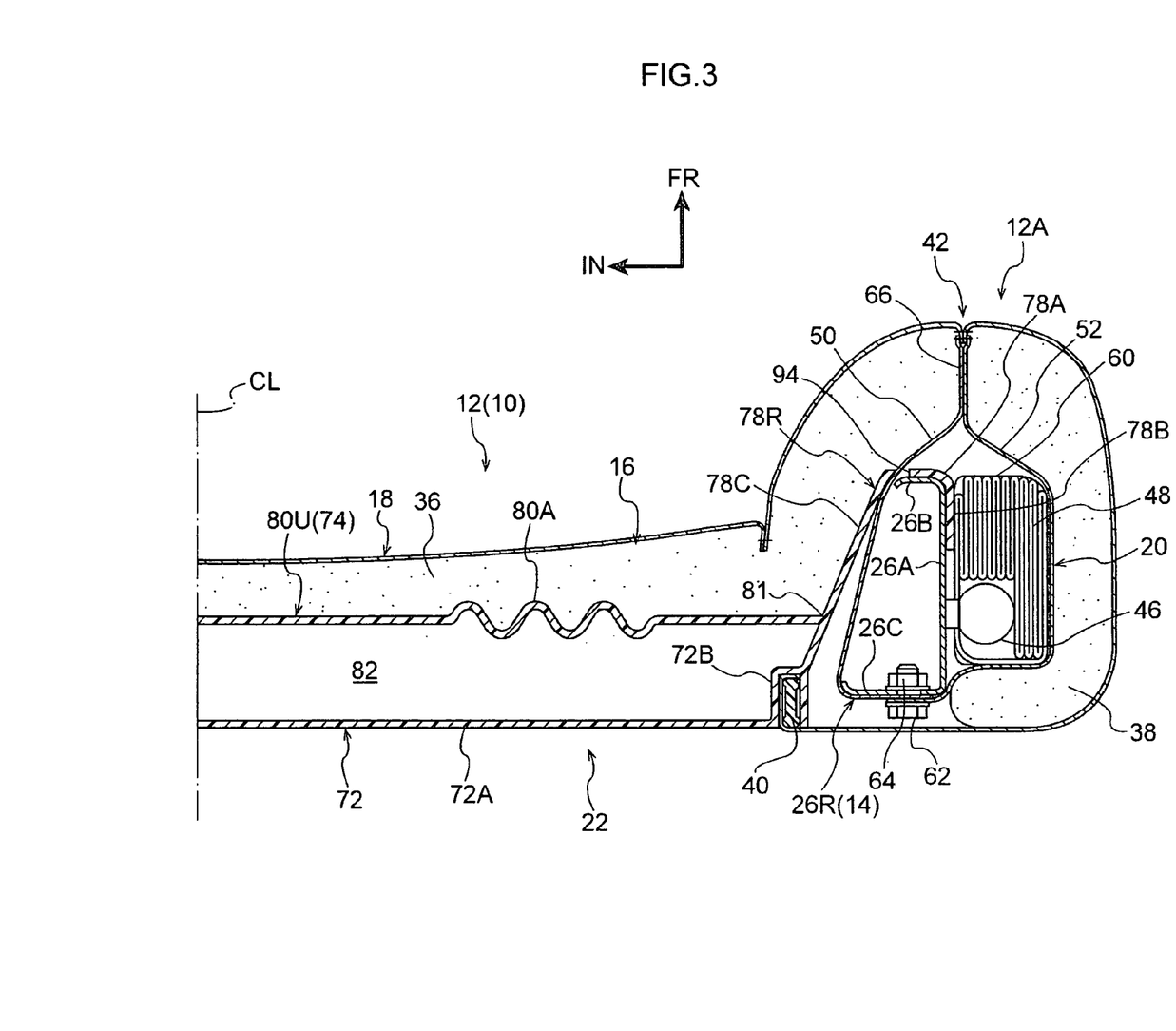
FIG. 3 is a horizontal cross-section taken along line 3-3 in FIG. 2.
Figure 4:
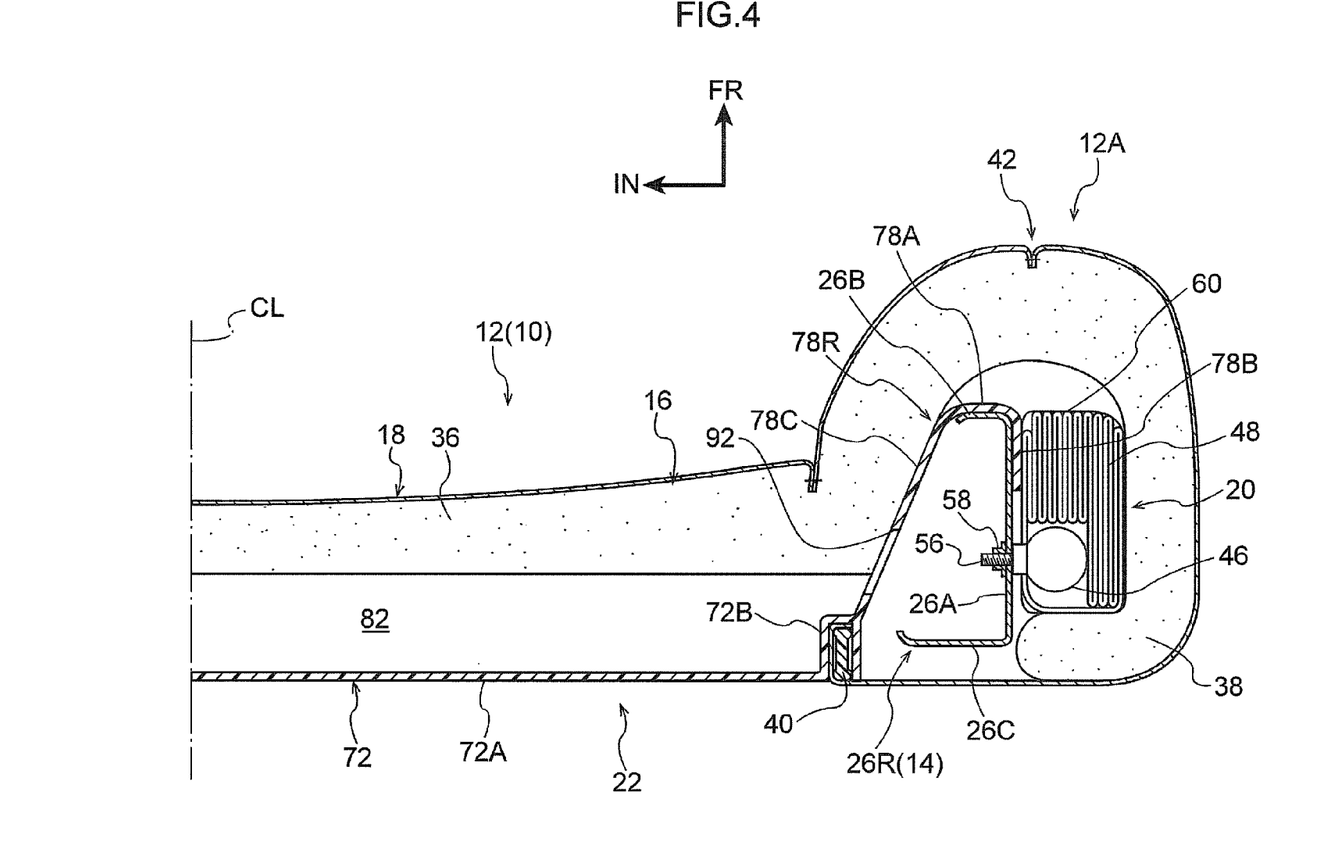
FIG. 4 is a horizontal cross-section taken along line 4-4 in FIG. 2.
Figure 5:
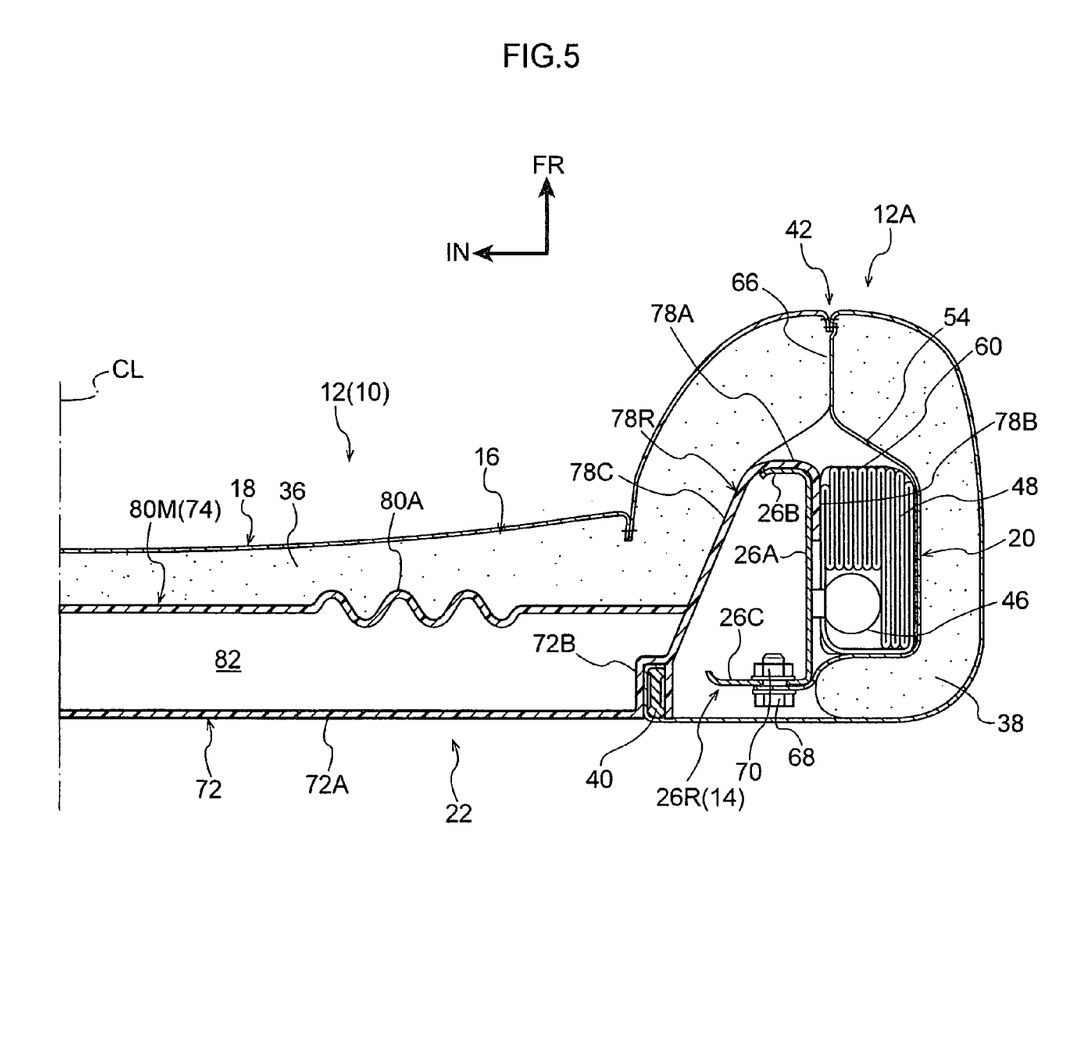
FIG. 5 is a horizontal cross-section taken along line 5-5 in FIG. 2.

As shown in FIG. 1, the seat cover 18 is formed in a size that enables it to be covered over the seatback pad 16 from the front side. As shown in FIG. 3 to FIG. 5, an outer peripheral anchor member 40 is attached by sewing to an appropriate position of an outer peripheral portion of the seat cover 18. The outer peripheral anchor member 40 is inserted into an anchor portion 72B of the resin seatback spring 22 from the seat rear side and anchored thereto. The outer peripheral portion of the seat cover 18 is thereby detachably anchored to the anchor portion 72B. The seat cover 18 is further provided with plural anchor portions, not shown in the drawings, and the anchor portions are anchored to the resin seatback spring 22.

The seat cover 18 is provided with a sewn portion 42 that extends in the seatback height direction at a location facing a front edge portion at the vehicle width direction outside of the pad side portion 38. The sewn portion 42 is configured so as to split open together with the pad side portion 38 during inflation and deployment of a side airbag 48, described later.

Configuration of the Side Airbag Device 20

As shown in FIG. 3 to FIG. 5, the side airbag device 20 is disposed inside a door-side side portion 12A of the seatback 12 (a side portion at the side of a side door, not shown in the drawings). The side airbag device 20 is disposed further to the seat width direction outside than the vehicle width direction outside side-frame 26R that is disposed inside the door-side side portion 12A (see FIG. 2). The side airbag device 20 is configured including an inflator 46 (a gas generation unit), a side airbag 48, an inside force cloth 50 (an inside airbag inflation pressure transmission member), and a top and bottom pair of outside force cloths 52, 54 (an outside airbag inflation pressure transmission member). The side airbag 48 is disposed inside the door-side side portion 12A in a folded-up state, unitized with the inflator 46.

The inflator 46 is formed in a circular columnar shape, disposed at a lower side portion of the door-side side portion 12A with the axial direction (the length direction) aligned in the seatback height direction. A top and bottom pair of stud bolts 56 (fixing members) are provided to an outer peripheral portion of the inflator 46, the stud bolts 56 projecting towards the radial direction outside of the inflator 46. The stud bolts 56 pass through through-holes formed in side wall portion 26A of the side-frame 26R and project towards the seat width direction inside of the side wall portion 26A. A top and bottom pair of nuts 58 (fixing members) are provided at the seat width direction inside of the side wall portion 26A, and the nuts 58 are screwed onto each of the stud bolts 56. The inflator 46 is thereby fastened and fixed to the side-frame 26R. Namely, during assembly of the inflator 46 (the side airbag device 20) to the side-frame 26R in the present exemplary embodiment, configuration is such that the top and bottom pair of stud bolts 56 are inserted through the through-holes in the side wall portion 26A from the seat width direction outside, and the nuts 58 are screwed onto the stud bolts 56 from the seat width direction inside of the side-frame 26R. In other words, configuration is made such that the operation to screw the nuts 58 onto the pair of stud bolts 56 (the fixing operation of the side airbag device 20 to the side-frame 26R) is performed from the seat width direction inside of the side-frame 26R. Note that configuration may also be made wherein the inflator 46 is attached to a retainer that is provided with the pair of stud bolts 56 (a configuration wherein the gas generation unit includes the retainer and the inflator).

The inflator 46 described above is connected to an airbag ECU, not shown in the drawings. In the event of a vehicle for example being involved in a side-on collision or rolling over, the airbag ECU determines whether or not to actuate the side airbag device 20 based on a detection signal from an airbag sensor, not shown in the drawings. Configuration is made such that when the airbag ECU makes determination to actuate the airbag, a specific current is caused to flow to the inflator 46, and a large volume of gas is ejected from the inflator 46.

The side airbag 48 formed by stitching a sheet shaped base cloth of for example cloth or a resin sheet into a bag shape. The inflator 46 that is housed inside the side airbag 48 is fastened and fixed to the side-frame 26R, thereby attaching the side airbag 48 to the side-frame 26R. The side airbag 48 is folded up by a specific folding pattern, and is retained in a folded-up state due to being wrapped in a readily rupturing wrap material 60.

The inside force cloth 50 and the top and bottom pair of outside force cloths 52, 54 are respectively formed in belt shapes (strap shapes), and are configured such that they stretch less readily than the seat cover 18. As shown in FIG. 3, a first length direction end portion of the inside force cloth 50 is fastened and fixed to the rear face of the rear wall portion 26C of the side-frame 26R by a bolt 62 and a nut 64. A length direction intermediate portion of the inside force cloth 50 extends towards the seat front side, passes to the seat width direction inside of the side-frame 26R, is inserted through an insertion hole 94 formed in a frame attachment section 78R of the resin seatback spring 22, described later, and is also inserted inside a slit portion 66 formed to a front portion side of the pad side portion 38. The slit portion 66 extends in the seat front-rear direction between the side airbag device 20 and the sewn portion 42 of the seat cover 18. A length direction second end portion of the inside force cloth 50 that is inserted inside the slit portion 66 is sewn to the sewn portion 42.

The upper side outside force cloth 52 (see FIG. 3) is disposed at the same height as the inside force cloth 50, and a length direction first end portion of the upper side outside force cloth 52 is fastened and fixed to the rear face of the rear wall portion 26C by the bolt 62 and the nut 64. A length direction intermediate portion of the outside force cloth 52 extends towards the seat front side, passes to the seat width direction outside of the side airbag device 20 and is also inserted inside the slit portion 66. A length direction second end portion of the outside force cloth 52 is sewn to the sewn portion 42.

The lower side outside force cloth 54 (see FIG. 5) is disposed below the upper side outside force cloth 52, and a length direction first end portion of the lower side outside force cloth 54 is fastened and fixed to the rear face of the rear wall portion 26C by a bolt 68 and a nut 70. A length direction intermediate portion of the outside force cloth 54 extends towards the seat front side, passes to the seat width direction outside of the side airbag device 20, and is also inserted inside the slit portion 66 described above. A length direction second end portion of the outside force cloth 54 is sewn to the sewn portion 42. Note that configuration may also be made such that the respective length direction first end portions of the inside force cloth 50 and the upper and lower outside force cloths 52, 54 are not directly fixed to the rear wall portion 26C (the side-frame 26R), but are indirectly fixed to the side-frame 26R through brackets. In the present exemplary embodiment, the inside force cloth 50 impinges on the seat width direction inside end portion of the front wall portion 26A and the seat width direction inside end portion of the rear wall portion 26C, however configuration may be made with additional protective members to protect the impinging locations. Such protective members may be sewn to the inside force cloth 50, or may be attached to the respective seat width direction inside end portions of the front wall portion 26A and the rear wall portion 26C.

In the side airbag device 20 configured as described above, when the inflator 46 actuates, a large volume of gas is ejected inside the side airbag 48, and the side airbag 48 inflates inside the door-side side portion 12A. When the side airbag 48 inflates, the inside force cloth 50 and the top and bottom pair of outside force cloths 52, 54 are imparted with inflation pressure of the side airbag 48 and stretch. Back inflation pressure is accordingly concentrated on the sewn portion 42 of the seat cover 18, rupturing the thread with which the sewn portion 42 is sewn. As a result, the sewn portion 42 splits open, and the side airbag 48 inflates and deploys through the ruptured portion towards the seat front side of the door-side side portion 12A, namely between an occupant seated in the vehicle seat 10 and the side door. Configuration is accordingly such that an occupant is protected from the impact of for example a side-on collision.

Configuration of the Resin Seatback Spring 22

The resin seatback spring 22 is formed from a resin material, and as shown in FIG. 1 to FIG. 5, is integrally molded including a backboard section 72 disposed at a back face of the seatback 12, a bottom side back spring section 74 (resin spring section) disposed between the left and right side-frames 26L, 26R further towards the seat front side than the backboard section 72, a top side back spring section 76 disposed above the bottom side back spring section 74 and coupled to the backboard section 72, and a left and right pair of frame attachment sections 78L, 78R supported by the left and right side-frames 26L, 26R of the seatback frame 14 and also coupled to the backboard section 72 and the bottom side back spring section 74.

The backboard section 72 is configured including a board body 72A formed slightly smaller than the seatback frame 14, and the anchor portion 72B that extends from an outer peripheral portion of the board body 72A towards the seat front side. The board body 72A is formed in a substantially rectangular flat plate shape slightly smaller than the inner peripheral rim of an insertion hole formed in the rectangular frame shaped seatback frame 14. The board body 72A is disposed at the back face of the seatback 12 in a state with the plate thickness direction aligned in the seatback 12 front-rear direction. The board body 72A is capable of passing through the inside of the seatback frame 14.

The anchor portion 72B is provided at an upper end portion and both seat width direction end portions of the outer peripheral section of the board body 72A, and is formed in an inverted U-shape as viewed along the seat front-rear direction. The anchor portion 72B is configured with a U-shape cross-section, opening towards the seat rear side. The anchor portion 72B is employed as a cover anchor portion for anchoring the outer peripheral anchor member 40 that is attached to the outer peripheral portion of the seat cover 18, as described above. However the anchor portion 72B also functions to reinforce the plate shaped board body 72A, raising the overall face rigidity of the backboard section 72.

The bottom side back spring section 74 is configured including 3 back spring body sections 80U, 80M, 80L, that are disposed parallel to each other in 3 tiers from top to bottom in the seatback height direction. The back spring body sections 80U, 80M, 80L are each formed in an overall elongated plate shape, and disposed in a state in which their length directions run along the seat width direction and their plate thickness directions run along the seat front-rear direction. Both length direction end portions of each of the back spring body sections 80U, 80M, 80L are coupled to left and right coupling portions 78C that are respectively provided with left and right frame attachment sections 78L, 78R. The 3 back spring body sections 80U, 80M, 80L accordingly span between the left and right frame attachment sections 78L, 78R, and are coupled together in the seatback height direction by the left and right frame attachment sections 78L, 78R. Note that the number of back spring body sections 80 (resin spring sections) that configure the bottom side back spring section 74 is optional, and can be appropriately modified according to a relationship with a required cushioning performance. Configuration may accordingly be made with one back spring body section with an increased top-bottom width, or conversely configuration may be made with 2 or 4 or more plural back body spring sections.

A left and right pair of slack portions 80A are formed at a seat width direction central side of each of the back spring body sections 80U, 80M, 80L. The slack portions 80A are formed at each of the left and right sides of a length direction central portion of each of the back spring body sections 80U, 80M, 80L. When viewed in horizontal cross-section, as shown in FIG. 3 and FIG. 5, the slack portions 80A are formed with a wave profile by connecting together plural individual curved faces along the seat width direction. Thereby, the back spring body sections 80U, 80M, 80L are configured such that the slack portions 80A resiliently extend when load is applied towards the backboard section 72 side (the seat rear side), and the back spring body sections 80U, 80M, 80L accordingly undergo bowing deformation (resilient deformation) towards the backboard section 72 side that is in the load application direction.

Note that the back spring body sections 80U, 80M, 80L are disposed at positions separated by a specific distance from the seat front side of the backboard section 72, described above, and bowing deformation is possible within the range of a gap 82 formed between the two respective sections. In other words, the backboard section 72 also functions as a restricting member that restricts the amount of bowing of the back spring body sections 80U, 80M, 80L to a specific amount or less. The slack portions 80A of the back spring body sections 80U, 80M, 80L are also set with a draft angle (taper shape) such that in resin molding employing a slide mold, not shown in the drawings, the slide mold can be removed from the mold from one side or the other in the seatback height direction (the bottom side in this case).

The top side back spring section 76 is provided at a position separated by a specific distance in the seatback height direction from the bottom side back spring section 74. The top side back spring section 76 has basically the same configuration as the back spring body sections 80U, 80M, 80L described above, is provided with slack portions 76A that are similar to the slack portions 80A described above. However, through holes 84 (see FIG. 1) are formed in both length direction end portions of the top side back spring section 76, and resin clips 86 (see FIG. 2) are inserted through the through holes 84 and fit into and are anchored into the attachment holes 34 (see FIG. 1) in the side-frames 26L, 26R. The top side back spring section 76 is thereby fixed to the side-frames 26L, 26R.

The left and right frame attachment sections 78L, 78R are disposed at the same height in the seatback 12 as the height at which the side airbag 48 is disposed. The frame attachment sections 78L, 78R are formed with an open cross-section profile, open towards the seat rear side when viewed in horizontal cross-section. The frame attachment sections 78L, 78R fit together with the front sides of the left and right side-frames 26L, 26R (see FIG. 3 to FIG. 5). Specifically, each of the frame attachment sections 78L, 78R is configured including a supported portion 78A supported by the front side of the side-frames 26L, 26R, a fixing portion 78B that extends from the seat width direction outside end portion of the supported portion 78A towards the seat rear side, and the coupling portion 78C that extends diagonally from the seat width direction inside end portion of the supported portion 78A towards the seat rear side and the seat width direction inside. The frame attachment sections 78L, 78R fit together with the front sides of the side-frames 26L, 26R. Note that configuration may be made such that the frame attachment sections 78R, 78L do not directly fit together with the front sides of the side-frames 26L, 26R, with a separate member (for example a resilient member) interposed between the two (a configuration wherein the frame attachment sections 78L, 78R indirectly fit together with the front sides of the side-frames 26L, 26R).

The supported portion 78A faces (contacts) the front wall portion 26B from the seat front side, and the fixing portion 78B faces (contacts) the side wall portion 26A from the seat width direction outside. Each fixing portion 78B is formed with a top and bottom pair of through holes 88 (see FIG. 1), and a resin clip 90 (see FIG. 2) is inserted through each through hole 88 and fitted into and anchored to the corresponding attachment hole 32 in the side wall portion 26A. The fixing portions 78B (the coupling portions 78C) are thereby fixed to the side-frame 26R and the side-frame 26L. Note that various approaches may be adopted for the method of fixing the coupling portions 78C to the side-frames 26L, 26R including, for example, a configuration wherein resin clips (fixing members) are integrally formed to the fixing portions 78B and are fitted into the attachment holes 32, configurations involving fastening with fasteners such as rivets, screws, or bolts and weld nuts, or a configuration involving bonding with structural adhesive.

Each coupling portion 78C is inclined to the seat front-rear direction so as to head towards the seat width direction inside on progression towards the seat rear side, and extends from the vicinity of the seat width direction inside end portion of the front wall portion 26B to the vicinity of the back face of the seatback 12. Length direction end portions of the 3 top-to-bottom back spring body sections 80U, 80M, 80L are coupled to front-rear direction intermediate portions of the coupling portions 78C, and a front end portion of each of the anchor portions 72B of the backboard section 72 is coupled to a rear end portion of the respective coupling portion 78C. The left and right coupling portions 78C face the left and right side-frames 26L, 26R from the seat width direction insides, and the left and right side-frames 26L, 26R are covered from the seat width direction insides by the left and right coupling portions 78C (the frame attachment sections 78L, 78R) at the height at which the left and right coupling portions 78C are provided (the bottom side portion of the seatback frame 14).

As shown in FIG. 2, in the present exemplary embodiment, a top and bottom pair of openings 92 are formed to the coupling portion 78C of the frame attachment section 78R disposed at the vehicle width direction outside. Each of the openings 92 is formed in a substantially rectangular shape with the front end sides thereof configured in a circular arc shape (substantially circular shape). The openings 92 are disposed at positions in the seatback height direction that are displaced with respect to the 3 back spring body sections 80U, 80M, 80L. Specifically, a top side opening 92 is disposed at a height between the upper tier back spring body section 80U and the middle tier back spring body section 80M, and a bottom side opening 92 is disposed at a height between the middle tier back spring body section 80M and the lower tier back spring body section 80L. As shown in FIG. 2 and FIG. 4, the top side opening 92 is formed at a position facing along the seat width direction towards the top side stud bolt 56 and nut 58 out of the previously described top and bottom pairs of stud bolts 56 and nuts 58. The bottom side opening 92 is disposed at a position facing along the seat width direction towards the bottom side stud bolt 56 and nut 58 (see FIG. 2).

Each opening 92 is configured such that the nut 58 and a tool (for example a socket wrench) for rotating the nut 58 can be inserted therein. Configuration is made such that the stud bolts 56 and the nuts 58 can be screwed together by inserting the nuts 58 and the tool through the openings 92 from the seat width direction inside. Note that the shape of the openings 92 is not limited to the shape shown in FIG. 2, and the openings 92 may be formed with other shapes (for example a circular shape or a rectangular shape). However a circular or close-to circular shape is preferable from the perspective of avoiding stress concentration.

As shown in FIG. 3, in the present exemplary embodiment the elongated slit shaped insertion hole 94 extending in the seatback height direction is formed to an upper portion side of the supported portion 78A of the frame attachment section 78R disposed at the vehicle width direction outside. The insertion hole 94 is disposed at the same height as the upper tier back spring body section 80U and facing the front wall portion 26B of the side-frame 26R. As explained above, the length direction intermediate portion of the inside force cloth 50 is inserted into the insertion hole 94.

Note that in the present exemplary embodiment, the side portion (the vehicle width direction inside side portion) at the opposite side to the door-side side portion 12A of the seatback 12 is not provided with the side airbag device 20. The vehicle width direction inside-frame attachment section 78L is accordingly configured such that the openings 92 and the insertion hole 94 are not formed thereto. Except in this respect, other configuration elements of the seatback 12 described above are formed with shapes to give left-right symmetry.

During assembly of the resin seatback spring 22 configured as described above to the seatback frame 14, the resin seatback spring 22 is mounted to the seatback frame 14 from the seat front side. Configuration is made such that the backboard section 72 is passed through the inside of the seatback frame 14 and disposed at the back face side of the seatback frame 14.

The left and right frame attachment sections 78L, 78R fit together with the front sides of the left and right side-frames 26L, 26R.

Operation and Advantageous Effects of the Present Exemplary Embodiment Explanation follows regarding the operation and advantageous effects of the present exemplary embodiment.

In the present exemplary embodiment, when an occupant sits in the vehicle seat 10 and rests against the seatback 12, load towards the seatback rear side is input to the bottom side back spring section 74 and the top side back spring section 76 provided to the resin seatback spring 22. The back spring body sections 80U, 80M, 80L of the bottom side back spring section 74 and the top side back spring section 76 accordingly undergo bowing deformation towards the seat rear side, the load application direction, contributing to the cushioning performance of the seatback 12. The load input to the top side back spring section 76 is supported by the left and right side-frames 26L, 26R through both length direction end portions of the top side back spring section 76. The load input to the bottom side back spring section 74 is supported by the left and right side-frames 26L, 26R through the left and right frame attachment sections 78L, 78R. The frame attachment sections 78L, 78R are formed with an open cross-section profile towards the seat rear side, and fit together with the front sides of the left and right side-frames 26L, 26R. The support provided by the bottom side back spring section 74 can accordingly be stabilized since reaction force from the left and right side-frames 26L, 26R can be well supported by the left and right frame attachment sections 78L, 78R.

Moreover, in the present exemplary embodiment, the bottom side back spring section 74 and the top side back spring section 76 are made out of resin and integrated together with the backboard section 36. The number of components and the number of assembly operations can accordingly be reduced, and also a reduction in weight and reduction in costs can be achieved in comparison to cases in which the spring sections are configured from seatback springs made out of metal.

In the present exemplary embodiment, the left and right frame attachment sections 78L, 78R of the resin seatback spring 22 are disposed at the disposal height of the side airbag 48 of the seatback 12. The top and bottom pairs of stud bolts 56 and nuts 58 that fasten and fix the side airbag device 20 to the side-frame 26R are covered by the coupling portion 78C of the vehicle width direction outside-frame attachment section 78R. However, the top and bottom pair of openings 92 is formed to the frame attachment section 78R at positions facing the top and bottom pairs of stud bolts 56 and nuts 58. During manufacture of the vehicle seat 10, the side airbag device 20 can thereby be fastened and fixed to the side-frame 26R by inserting the nuts 58 and the tool (for example a socket wrench) through the openings 92 and screwing the nuts 58 onto the stud bolts 56 even in cases where the resin seatback spring 22 is assembled to the seatback frame 14 before the side airbag device 20 is assembled to the side-frame 26R. Good characteristics can accordingly be achieved in assembly operations of the side airbag device 20 to the side-frame 26R.

Moreover, in the present exemplary embodiment, the top and bottom pair of openings 92 are disposed displaced with respect to the 3 back spring body sections 80U, 80M, 80L in the seatback height direction. Load input to the back spring body sections 80U, 80M, 80L can accordingly be well-supported at locations in the frame attachment section 78R at which the openings 92 are not formed. The support of the 3 back spring body sections 80U, 80M, 80L can thereby be stabilized. The top and bottom pair of openings 92 also respectively face towards the top and bottom pair of stud bolts 56 provided to the inflator 46. Good assembly operation characteristics can accordingly be achieved when the inflator 46 (the side airbag device 20) provided with the pair of stud bolts 56 is being assembled to one of the side-frames.

In the present exemplary embodiment, each of the inside force cloth 50 and the top and bottom pair of outside force cloths 52, 54 has a first end portion fixed to the rear face of the rear wall portion 26C of the side-frame 26R and a second end portion sewn to the sewn portion 42 of the seat cover 18. The inside force cloth 50 and the top and bottom pair of outside force cloths 52, 54 stretch when the side airbag 48 provided to the side airbag device 20 inflates. The back inflation pressure is hence transmitted through the force cloths to the sewn portion 42 of the seat cover 18, thereby promptly splitting open the sewn portion 42 to allow the side airbag 48 to deploy promptly through the split portion. Moreover, an intermediate portion of the inside force cloth 50 is inserted into and passed through the insertion hole 94 formed in the front end portion (the supported portion 78A) of the vehicle width direction outside-frame attachment section 78R. The inside force cloth 50 can accordingly be laid out along the shortest path.

Note that the insertion hole 94 is disposed at the same height as the upper tier back spring body section 80U. When load from an occupant is input to the upper tier back spring body section 80U, it is conceivable that stress would be concentrated at the periphery of the insertion hole 94 in the frame attachment section 78R. However, in the present exemplary embodiment, the insertion hole 94 is formed in the supported portion 78A (front end portion) of the frame attachment section 78R, namely at a position distant from a connection portion 81 (see FIG. 3) between the upper tier back spring body section 80U and the coupling portion 78C. Stress is accordingly suppressed from being concentrated at the periphery of the insertion hole 94 when load from an occupant is input to the upper tier back spring body section 80U. Moreover, weakening of the frame attachment section 78R at the disposal height of the insertion hole 94 and the upper tier back spring body section 80U can be suppressed due to the openings 92 and the insertion hole 94 being disposed displaced with respect to each other in the seatback height direction. The support of the upper tier back spring body section 80U can accordingly be stabilized.

In the present exemplary embodiment, the upper side outside force cloth 52 is disposed at the same height as the inside force cloth 50, so the sewn portion 42 can be made to split open even more promptly at this height. The sewn portion 42 can however be made to promptly split open over a wide range in the top-to-bottom direction (the seatback height direction) due to providing the top and bottom pair of outside force cloths 52, 54, thereby enabling the side airbag deployment direction to be stabilized. The deployment performance of the side airbag 48 can be enhanced for the above reasons.

Supplementary Explanation of the Exemplary Embodiment

Figure 6:
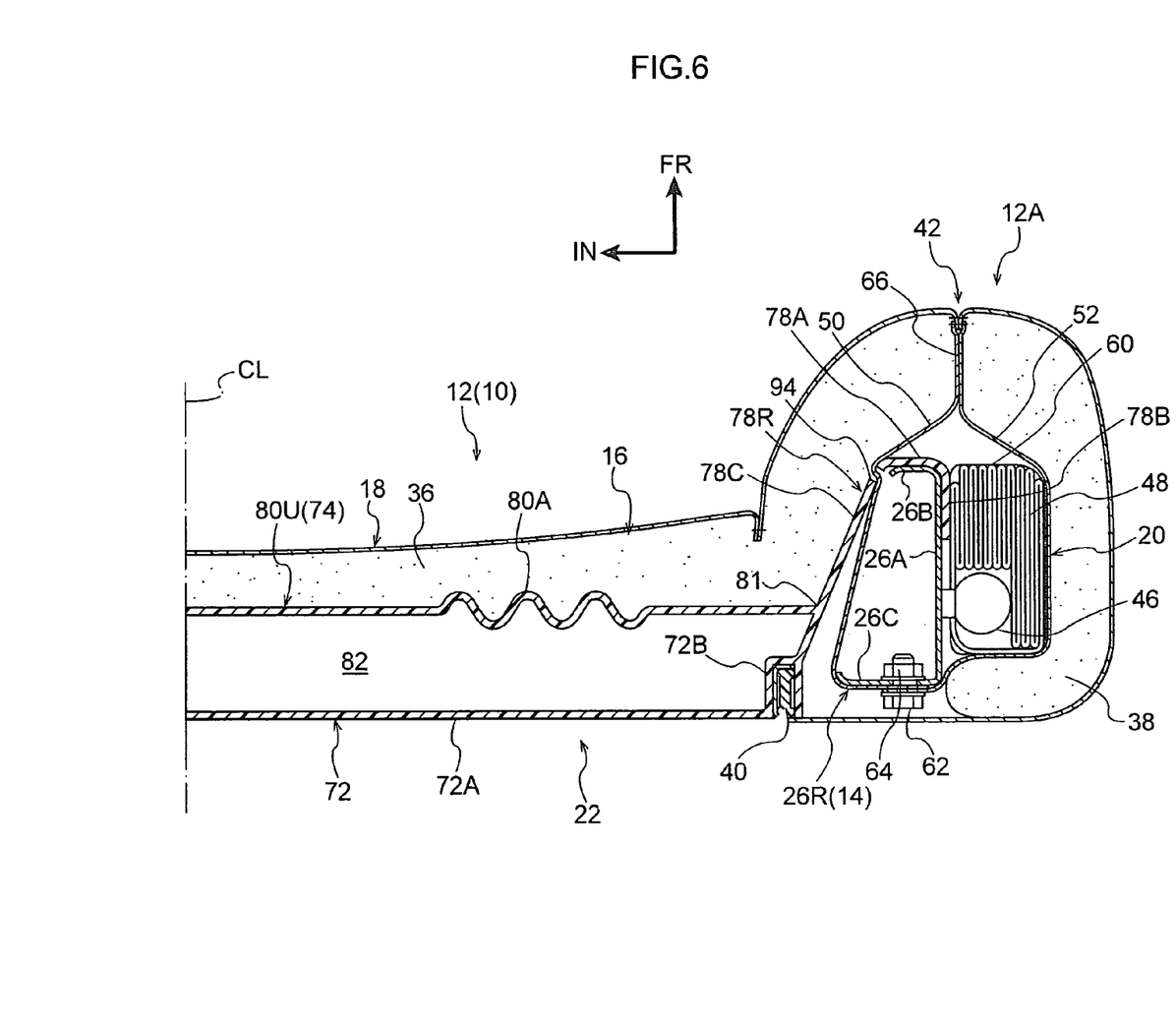
FIG. 6 is a horizontal cross-section corresponding to FIG. 3 and illustrating a modified example of an exemplary embodiment of the present invention.

In the above exemplary embodiment, configuration is made with the insertion hole 94 formed in the supported portion 78A, however the first to tenth aspects of the invention are not limited thereto, and as shown in the modified example illustrated in FIG. 6, configuration may be made such that the insertion hole 94 is formed in a front end side of the coupling portion 78C. In this modified example too, the layout path of the inside force cloth 50 can be made short and the support of the upper tier back spring body section 80U can be suppressed from being destabilized at the disposal height of the insertion hole 94. Moreover, in this modified example, the inside force cloth 50 can be laid out such that the inside force cloth 50 does not impinge on the front wall portion 26A of the side-frame 26R.

In the above exemplary embodiment, configuration is made wherein the openings 92 are not formed to the vehicle width direction inside-frame attachment section 78L, however the first to tenth aspects of the invention are not limited thereto, as long as an opening is provided to at least one out of left and right side-frame attachment sections. The resin seatback springs may be employed for both a driver's seat and passenger seat in cases where an opening is formed to both left and right frame attachment sections. A saving in manufacturing cost may thereby be achieved. Moreover, a good seating sensation can be achieved for an occupant due to the shape of the resin seatback springs having left-right symmetry, in comparison to cases where the shape of the resin seatback springs do not have left-right symmetry. The same point also applies to the insertion hole 94.

In the above exemplary embodiment, configuration is made wherein the side airbag device 20 is provided with the inside force cloth 50 and the top and bottom pair of the outside force cloths 52, 54, however the first to fourth aspects of the inventions are not limited thereto, and configuration may be made with the force cloth(s) omitted. Appropriate modifications may also be made to the number and placement of the inside force cloth and the outside force cloths.

In the above exemplary embodiment, configuration is made wherein the top and bottom pair of openings 92 are disposed displaced from the 3 back spring body sections 80U, 80M, 80L (resin spring sections) in the seatback height direction. The first and second aspects of the invention are however not limited thereto, and configuration may be made such that the openings are disposed at the same heights as the resin spring sections.

In the above exemplary embodiment, configuration is made such that the openings 92 are respectively formed at positions in the first frame attachment section 78R facing towards the pairs of the stud bolts 56 and the nuts 58. The first to eighth aspects, and tenth aspect of the invention are however not limited thereto, and appropriate modifications may be made to the number of openings according to the fixing structure of the side airbag device.

In the present exemplary embodiment, configuration is made with the fixing portions 78B provided to the left and right frame attachment sections 78R, 78L, however the first to tenth aspects of the invention are not limited thereto, and configuration may be made with the fixing portions 78B omitted. In such cases, configuration is for example such that the supported portion 78A is fixed to the side-frame 26R or the side-frame 26L using for example clips.

In the above exemplary embodiment, configuration is made such that the backboard section 72, the left and right frame attachment sections 78R, 78L, the bottom side back spring section 74 and the top side back spring section 76 are integrally molded. However the first to tenth aspects of the invention are not limited thereto, and configuration may be made whereby each component is molded separately, and then integrated together by for example welding.

In the above exemplary embodiment, configuration is made wherein the openings 92 are always open. The first to tenth aspects of the invention are however not limited thereto, and configuration may be made including door portions that are integral to the frame attachment section(s) or integrated to the frame attachment sections(s) for opening or closing the openings.

Various other modifications may be carried out to the present invention within a scope that does not depart from the spirit of the invention. Needless to say, the scope of rights claimed by the present invention is not limited to each of the exemplary embodiments described above.

The invention claimed is:

1. A vehicle seat comprising:
   a seatback frame comprising left and right side-frames;
   a side airbag device that is disposed at a seat width direction outside of a first of the left or right side-frames and is fixed to the first side-frame from the seat width direction inside by a fixing member; and
   a resin seatback spring comprising at least one resin spring section disposed between the left and right side-frames and between left and right frame attachment sections that are respectively supported at front sides of the left and right side-frames, the left and right frame attachment sections extending in the seat width direction from inside of the left and right side-frames towards a seat rear side and being coupled to the resin spring section, the resin seatback spring being formed with at least one opening at a position facing the fixing member in a first of the frame attachment sections supported at the first side-frame, wherein the left and right frame attachment sections include at least one fixing portion that contacts a side wall portion of the left and right side-frames in the seat width direction outside and that fixes the left and right frame attachment sections to the left and right side-frames, respectively,
   wherein the resin seatback spring further comprises a backboard section that is disposed at a seatback back face towards the seat rear side of a plurality of resin spring sections and is coupled to the left and right frame attachment sections.

2. The vehicle seat of claim 1, wherein the resin spring section comprises a plurality of back spring body sections disposed in a row along a seatback height direction, and the opening is disposed at a different position, in the seatback height direction with respect to the plurality of back spring body sections.

3. The vehicle seat of claim 1, further comprising:
   a seatback pad supported by the seatback frame;
   a seat cover covering the seatback pad; and
   an inside airbag inflation pressure transmission member, a first end portion of the inside airbag inflation pressure transmission member being fixed to a rear end side of the first side-frame, an intermediate portion of the inside airbag inflation pressure transmission member being inserted through an insertion hole formed in the first frame attachment section, and a second end portion of the inside airbag inflation pressure transmission member being sewn to a sewn portion of the seat cover.

4. The vehicle seat of claim 3, wherein the insertion hole is formed in a front end side of the first frame attachment section and is disposed at a same height as any one of a plurality of resin spring sections.

5. The vehicle seat of claim 3, further comprising an outside airbag inflation pressure transmission member, a first end portion of the outside airbag inflation pressure transmission member being fixed to the rear end side of the first side-frame, an intermediate portion of the outside airbag inflation pressure transmission member passing the side airbag device on the seat width direction outside, and a second end portion of the outside airbag inflation pressure transmission member being sewn to the sewn portion.

6. The vehicle seat of claim 5, the outside airbag inflation pressure transmission member further comprising a top and bottom pair of outside airbag inflation pressure transmission members, the top outside airbag inflation pressure transmission member being disposed at a same height as the inside airbag inflation pressure transmission member, and the bottom outside airbag inflation pressure transmission member being disposed below the top outside airbag inflation pressure transmission member.

7. The vehicle seat of claim 1, wherein the frame attachment sections are formed with open cross-section profiles that are open to the seat rear side, and that fit together with the front sides of the side-frames.

8. The vehicle seat of claim 1, wherein:
the fixing member comprises a pair of top and bottom stud bolts provided to a gas generation unit that is installed to the side airbag device and a pair of top and bottom nuts screwed onto the pair of stud bolts;
the side airbag device is fastened and fixed to the first side-frame by inserting the pair of stud bolts through the first side-frame from the seat width direction outside and screwing the pair of nuts onto the pair of stud bolts;
the resin seatback spring comprises three resin spring sections disposed at a different position, in a seatback frame height direction with respect to the pair of stud bolts and the pair of nuts; and
the at least one opening is formed in the first frame attachment section at a position facing one of the pair of stud bolts and one of the pair of nuts.

9. A resin seatback spring comprising:
a resin spring section disposed between left and right side-frames that are provided to a seatback frame of a vehicle seat; and
left and right frame attachment sections respectively comprising left and right supported portions respectively supported at front sides of the left and right side-frames, and left and right coupling portions that extend towards a seat rear side from respective seat width direction inside end portions of the left and right supported portions and are coupled to the resin spring section, wherein the left and right frame attachment sections are formed with open cross-section profiles that are open to the seat rear side and fit together with the front sides of the left and right side-frames, and an opening is formed in one of the left or right coupling portions, wherein the resin seatback spring further comprises a backboard section that is disposed at a seatback back face towards the seat rear side of a plurality of resin spring sections and is coupled to the left and right frame attachment sections.

10. A vehicle seat comprising:
a seatback frame comprising left and right side-frames;
a side airbag device that is disposed at a seat width direction outside of a first of the left or right side-frames and is fixed to the first side-frame from the seat width direction inside by a fixing member;
a resin seatback spring comprising at least one resin spring section disposed between the left and right side-frames and between left and right frame attachment sections that are respectively supported at front sides of the left and right side-frames, the left and right frame attachment sections extending in the seat width direction from inside of the left and right side-frames towards a seat rear side and being coupled to the resin spring section, the resin seatback spring being formed with at least one opening at a position facing the fixing member in a first of the frame attachment sections supported at the first side-frame;
a seatback pad supported by the seatback frame;
a seat cover covering the seatback pad; and
an inside airbag inflation pressure transmission member, a first end portion of the inside airbag inflation pressure transmission member being fixed to a rear end side of the first side-frame, an intermediate portion of the inside airbag inflation pressure transmission member being inserted through an insertion hole formed in the first frame attachment section, and a second end portion of the inside airbag inflation pressure transmission member being sewn to a sewn portion of the seat cover.

11. The vehicle seat of claim 10, wherein the insertion hole is formed in a front end side of the first frame attachment section and is disposed at a same height as any one of a plurality of resin spring sections.

12. The vehicle seat of claim 10, further comprising an outside airbag inflation pressure transmission member, a first end portion of the outside airbag inflation pressure transmission member being fixed to the rear end side of the first side-frame, an intermediate portion of the outside airbag inflation pressure transmission member passing the side airbag device on the seat width direction outside, and a second end portion of the outside airbag inflation pressure transmission member being sewn to the sewn portion.

13. The vehicle seat of claim 12, the outside airbag inflation pressure transmission member further comprising a top and bottom pair of outside airbag inflation pressure transmission members, the top outside airbag inflation pressure transmission member being disposed at a same height as the inside airbag inflation pressure transmission member, and the bottom outside airbag inflation pressure transmission member being disposed below the top outside airbag inflation pressure transmission member.

14. The vehicle seat of claim 10, wherein the frame attachment sections are formed with open cross-section profiles that are open to the seat rear side, and that fit together with the front sides of the side-frames.

* * * * *